L. BAGI.
AUTOMOBILE PULLER.
APPLICATION FILED SEPT. 28, 1917.
1,260,950. Patented Mar. 26, 1918.
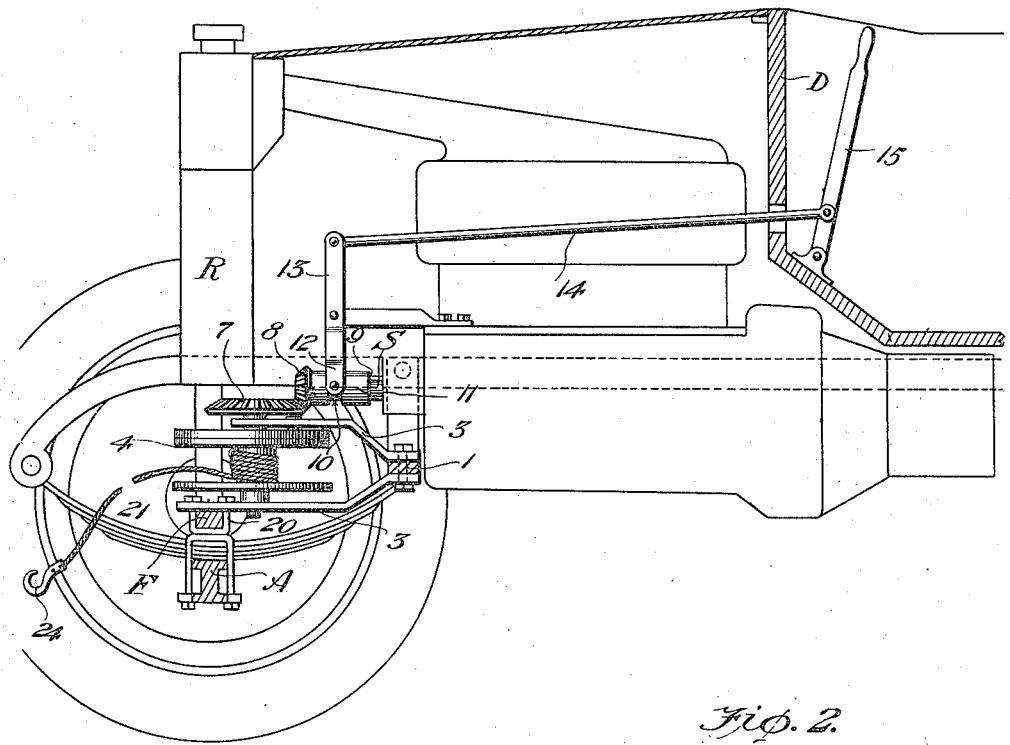
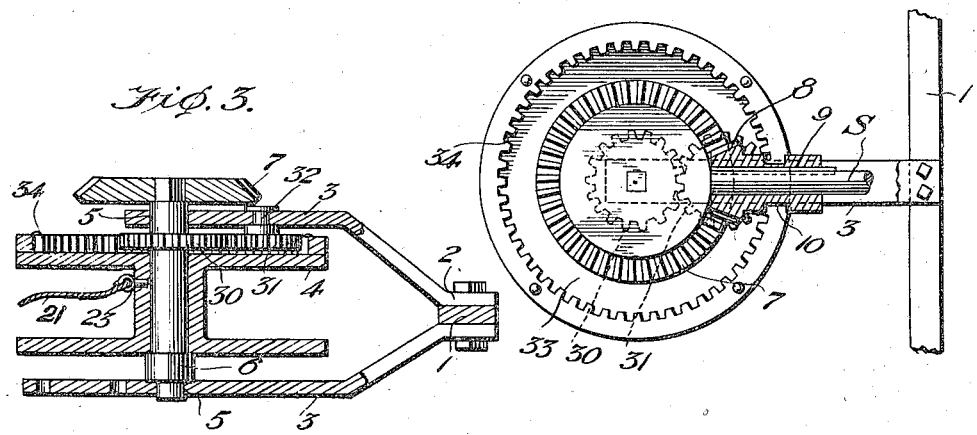
Witness
R. E. Rousseau.
N. L. Collamer.
Inventor
Louis Bagi,
By Victor J. Evans.
Attorney

UNITED STATES PATENT OFFICE.

LOUIS BAGI, OF GRANITE CITY, ILLINOIS.

AUTOMOBILE-PULLER.

1,260,950.

Specification of Letters Patent. Patented Mar. 26, 1918.

Application filed September 28, 1917. Serial No. 193,776.

*To all whom it may concern:*

Be it known that I, LOUIS BAGI, a citizen of Hungary, residing at Granite City, in the county of Madison and State of Illinois, have invented new and useful Improvements in Automobile-Pullers, of which the following is a specification.

This invention relates to pulling implements, and more especially to those including a drum which is actuated by a motor; and the object of the same is to produce an attachment which may be applied to an automobile for use in pulling the same out of mud when it becomes stalled.

Details of construction are set forth in the following specification and shown in the drawings wherein:

Figure 1 is a sectional view of the forward portion of an automobile, and a side elevation of this attachment applied between its radiator and axle, ready for use.

Fig. 2 is an end elevation of the drum.

Fig. 3 is a vertical section through the device.

We are concerned only with that part of the automobile frame F which overlies the front axle A and underlies its radiator R, and the front end of the main or crank shaft S, but we have shown the dash D in diagram in Fig. 1. It is well known that in localities where the roads are bad the automobile often becomes stuck in the mud or sand, especially when it is heavily laden; and devices have been suggested for pulling the machine out of such stalled position by leading a cable forward from it and attaching the same to a tree, stump, a fence post or the like, and then winding on the rear end of the cable by means of mechanism driven by the motor itself. My present invention is along the same general lines, and contemplates the insertion of a small drum or windlass beneath the radiator and above the front axle, its attachment to the framework of the machine, and its connection with the main or crank shaft by simple means so as to put the rotation of the drum or windlass within the control of the operator sitting on the seat.

Coming now to details of the present invention, I may find it necessary in certain makes of machines to provide a cross bar 1 connected to the sides of the main frame F, and to this cross bar I attach the shank 2 of a yoke whose arms 3 pass astride a drum 4 and have bearings 5 in which is journaled a shaft 6. The latter carries a bevel gear 7 at one end, preferably its upper end, adapted to be engaged by a driving bevel gear 8 splined at 9 on the shaft S as shown. The hub of this gear is preferably provided with a groove 10 engaged by pins 11 in the arms of a fork 12 at the lower end of a pivoted lever 13, and the upper end of said lever is connected by a rod 14 with a hand lever 15 pivoted to the floor boards behind the dash D. When now the operator manipulates the hand lever, it is obvious that the driving gear 8 may be moved on its splined connection with the main shaft S into or out of engagement with the driven gear 7. The lower yoke arm 3 is preferably carried over the frame F at a point directly above the front axle A, and a clip or other fastening device 20 secures the front end of this arm thereto. There is ordinarily a space between this frame bar and the bottom of the radiator R, and it is in this space beneath the shaft S that I propose to dispose the drum 4—therefore this drum should be rather flat as illustrated, or in other words its hub should be short and its flanges deep for the reception of the winding cable 21. One end of the latter is attached to this hub at the point 23 and the other end carries a hook or similar device 24 so that when the front end of the cable is passed around a tree or stump the hook may be engaged with the cable itself in a manner which will be clear.

In order to further economize room, I prefer to connect the shaft 6 with the hub of the drum by the gearing best shown in Fig. 2. This includes a small driving gear 30 fast on the shaft 6, an idler 31 pivoted at 32 to one end 3 of the yoke and in mesh with said gear, and an internal ring of teeth 34 secured peripherally around the drum and in mesh with the outer side of the idler. The parts are entirely of metal and further details need not be described. The use of automobile pullers of this character is so well known that it will not need repeating here, but I might say in brief that when the machine becomes stalled the cable 21 is carried forward and its hooked end 23 engaged with a tree or the like, then the engine started and the driving gear 8 moved into mesh with the driven gear 7, and the rotation of the shaft 6 through the gearing above-described, and shown in Fig. 2, turns the drum and winds the cable thereon to pull the machine out of the mud.

What is claimed as new is:—

1. In an automobile puller, the combination with a cross-bar adapted for connection with the frame, a yoke whose stem is connected with said cross bar, and one of whose arms is connected with the frame, an upright shaft journaled in the yoke-arms, and means for connecting its upper extremity with the crank shaft of the engine at will; of a drum having a tubular hub rotatably mounted on said shaft between the yoke arms and an internally toothed ring on one end, a driving gear fast on said shaft in said ring, and an idler gear pivoted to said end of the drum and in mesh with the driving gear and toothed ring.

2. In an automobile puller, the combination with a yoke connected at relative opposite ends to the frame of the automobile, bearings in the yoke-arms between the yoke connections to the frame, a shaft journaled therein and having a bevel gear at its upper end, and a drum mounted on said shaft; of a driving gear splined on the engine shaft in position to mesh with said bevel gear, the hub of the driving gear having a groove, a lever forked at one end and the fork arms having internal pins engaging said groove, a hand lever mounted on the floor boards of the machine behind the dash, and connections between the levers.

In testimony whereof I affix my signature.

LOUIS BAGI.